US012404095B2

(12) United States Patent
Nadarian

(10) Patent No.: US 12,404,095 B2
(45) Date of Patent: Sep. 2, 2025

(54) TRASH RECEPTACLE WITH STORAGE COMPARTMENT

(71) Applicant: Marine Nadarian, Van Nuys, CA (US)

(72) Inventor: Marine Nadarian, Van Nuys, CA (US)

( * ) Notice: Subject to any disclaimer, the term of this patent is extended or adjusted under 35 U.S.C. 154(b) by 62 days.

(21) Appl. No.: 18/383,968

(22) Filed: Oct. 26, 2023

(65) Prior Publication Data

US 2025/0136360 A1 May 1, 2025

(51) Int. Cl.

*B65F 1/06* (2006.01)
*B65F 1/00* (2006.01)
*B65F 1/14* (2006.01)
*B65F 1/16* (2006.01)

(52) U.S. Cl.

CPC ................ *B65F 1/004* (2013.01); *B65F 1/06* (2013.01); *B65F 1/141* (2013.01); *B65F 1/16* (2013.01)

(58) Field of Classification Search

CPC ............ B65D 83/0888; B65D 83/0805; B65D 2209/00; B65D 5/38; B65D 5/16; A47K 10/421; A47K 2010/3233; A45C 13/02; A45C 3/00; A45C 3/06; A45C 5/00; A45C 5/065; A45C 1/024; B65F 1/062; B65F 1/06; B65F 1/068; B65F 1/141; B65F 2001/061; B65F 2220/12

USPC ......... 221/102; 206/233, 581; 150/104, 116, 150/113, 117; 220/495.07, 495.11, 908, 220/908.1, 495.08

See application file for complete search history.

(56) References Cited

U.S. PATENT DOCUMENTS 2,036,986 A * 4/1936 Treat ........................ A24F 15/18 131/239
2,463,993 A * 3/1949 Meyers .................... A45C 3/06 D3/319
5,127,720 A * 7/1992 Shultz ..................... A63F 3/068 206/39
6,568,555 B1 5/2003 LoCascio
D493,267 S 7/2004 Strobel
6,994,132 B2 * 2/2006 Antrobus ............... A45C 5/065 190/110
2007/0138184 A1 6/2007 Smith
2007/0216269 A1 9/2007 Kischitz
2022/0212863 A1 7/2022 Gann
2022/0356011 A1 11/2022 Beegle

FOREIGN PATENT DOCUMENTS

WO WO2007075700 7/2007

* cited by examiner

*Primary Examiner* — King M Chu

(57) ABSTRACT

A trash receptacle for storing garbage and other objects includes a container with a base wall and a perimeter wall. The perimeter wall is coupled to and extends upwardly from the base wall, and an upper edge of the perimeter wall defines an opening to the container. A storage compartment is coupled to the base wall of the container and comprises a tubular wall and a drawer. The tubular wall defines a channel which extends laterally with respect to the container and defines a pair of apertures to the channel which are laterally spaced with respect to the container. The drawer is slidably coupled to the tubular wall.

8 Claims, 10 Drawing Sheets

TRASH RECEPTACLE WITH STORAGE COMPARTMENT

BACKGROUND OF THE INVENTION

(1) Field of the Invention

The disclosure relates to trash receptacles and more particularly pertains to a new trash receptacle for storing garbage and other objects.

(2) Description of Related Art Including Information Disclosed Under 37 CFR 1.97 and 1.98

Myriad trash receptacles are disclosed by the prior art, but the prior art fails to describe such a trash receptacle which includes a storage compartment below a garbage-holding container with a drawer that can slide either of two lateral directions with respect to the container to access the drawer's contents.

BRIEF SUMMARY OF THE INVENTION

An embodiment of the disclosure meets the needs presented above by generally comprising a container with a base wall and a perimeter wall. The perimeter wall is coupled to and extends upwardly from the base wall, and an upper edge of the perimeter wall defines an opening to the container. A storage compartment is coupled to the base wall of the container and comprises a tubular wall and a drawer. The tubular wall defines a channel which extends laterally with respect to the container and defines a pair of apertures to the channel which are laterally spaced with respect to the container. The drawer is slidably coupled to the tubular wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
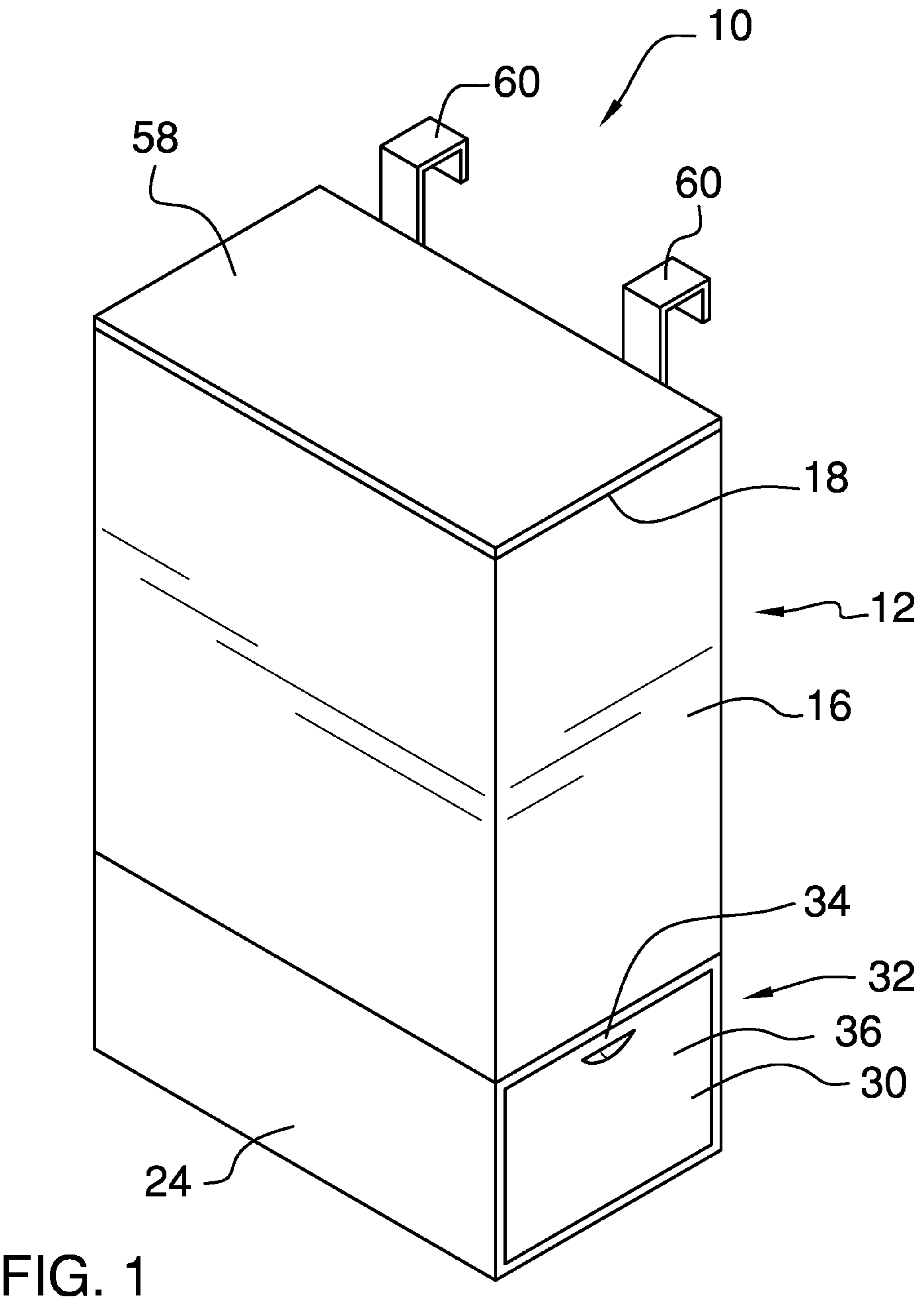
FIG. 1 is a perspective view of a trash receptacle according to an embodiment of the disclosure.
Figure 2:
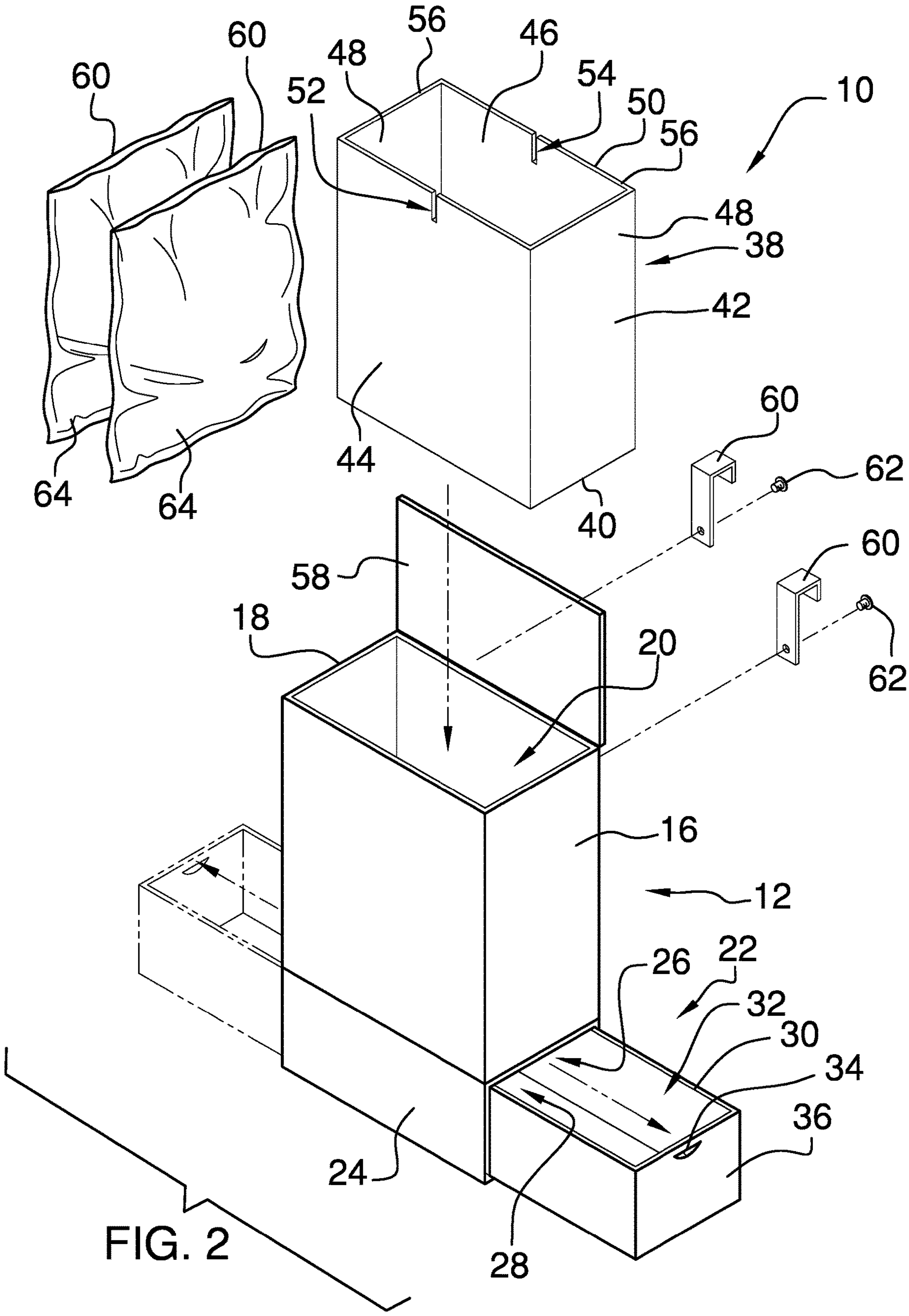
FIG. 2 is an exploded view of an embodiment of the disclosure.
Figure 3:
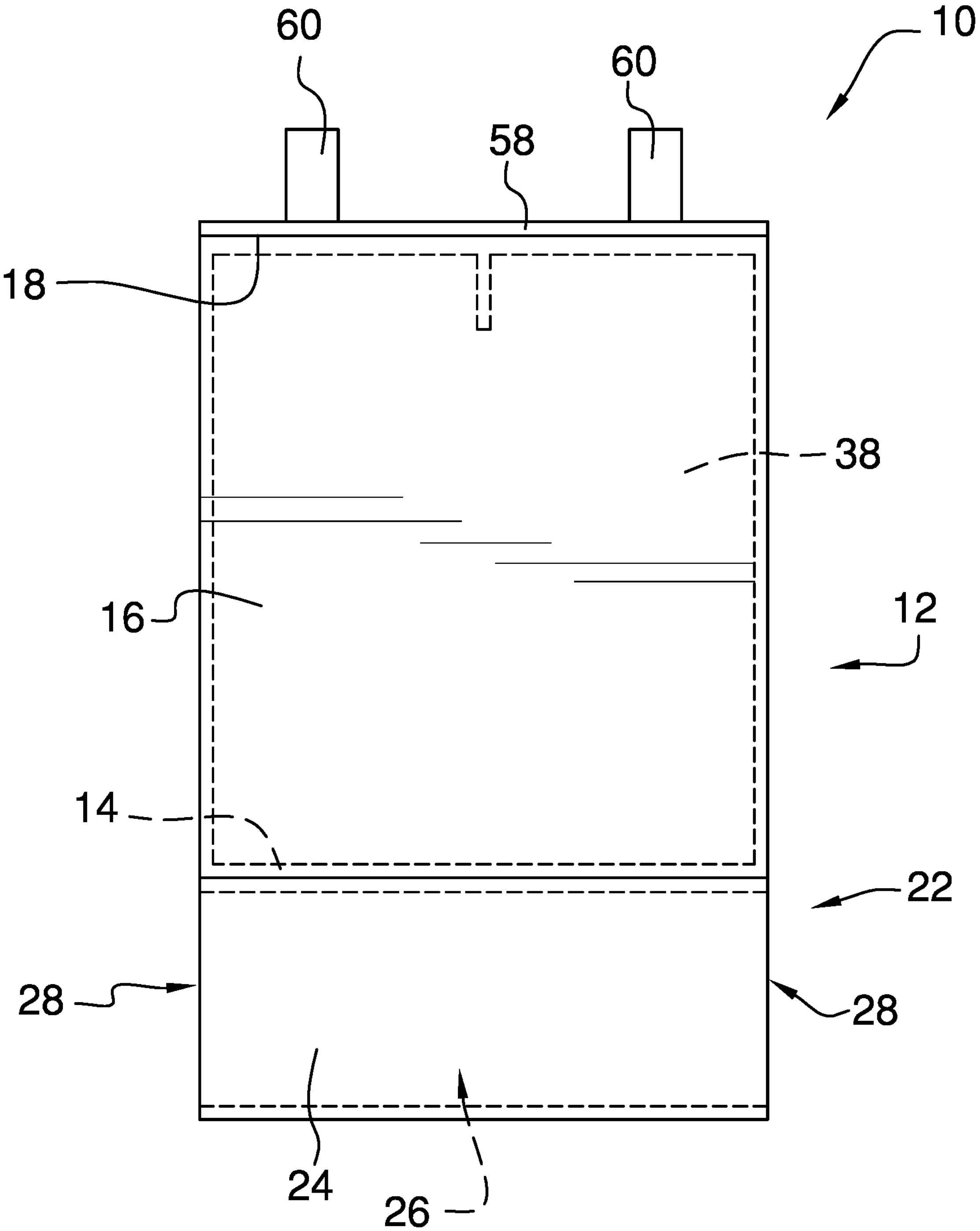
FIG. 3 is a front view of an embodiment of the disclosure.
Figure 4:
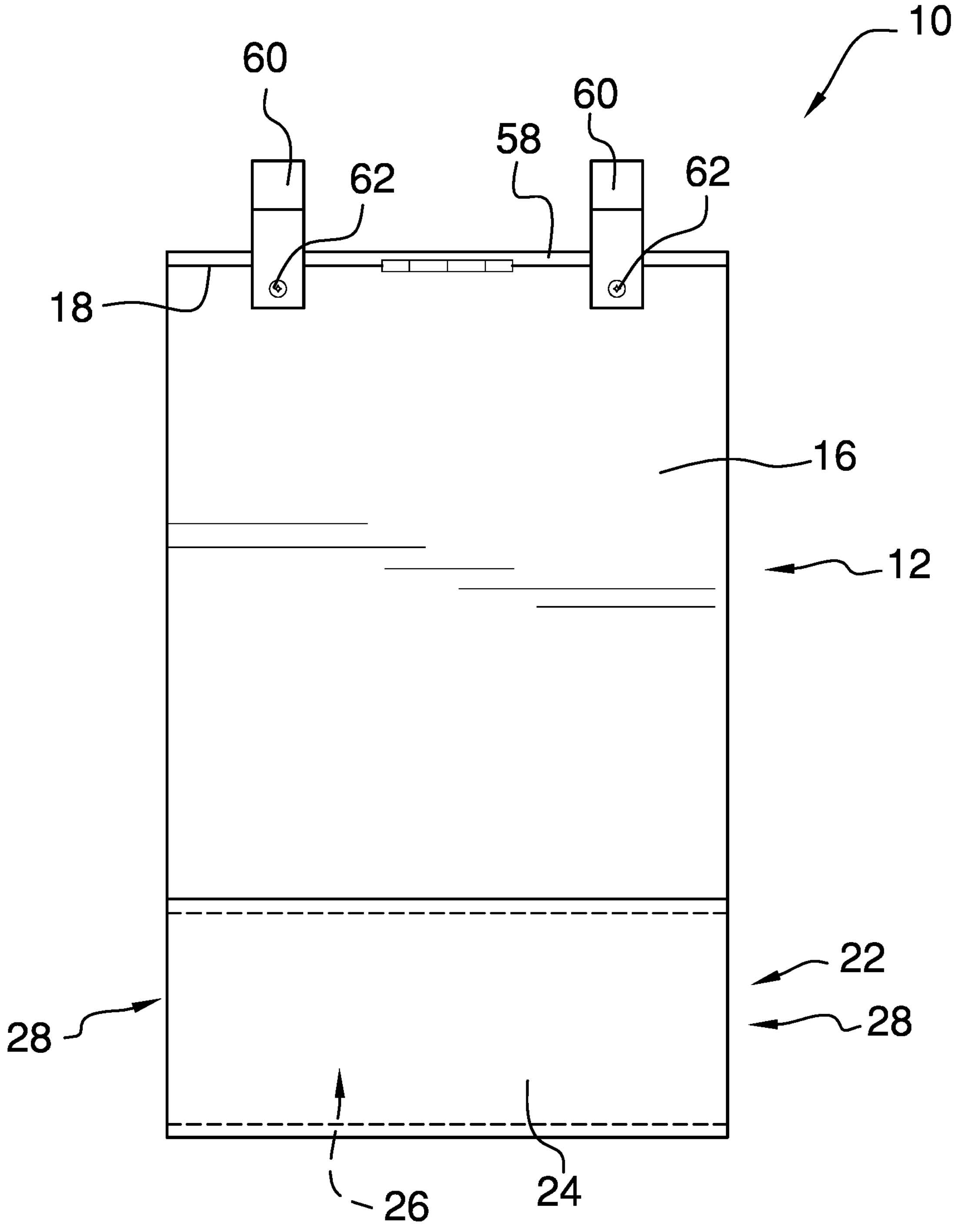
FIG. 4 is a back view of an embodiment of the disclosure.
Figure 5:
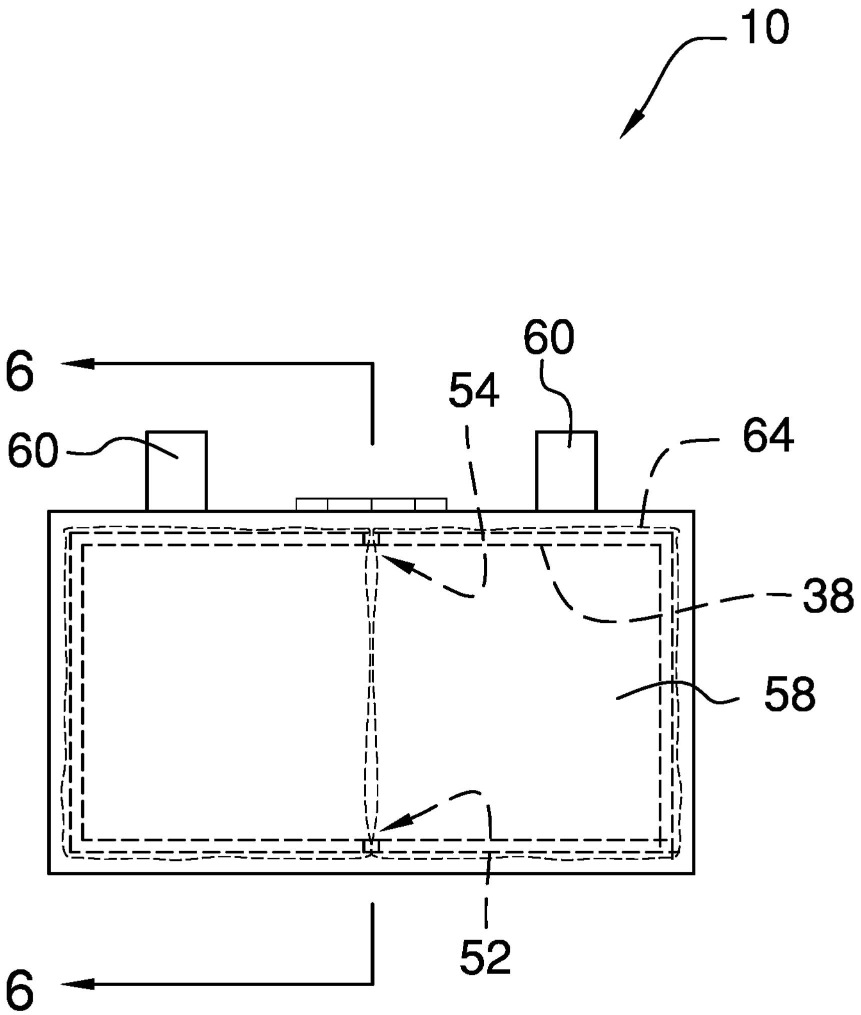
FIG. 5 is a top view of an embodiment of the disclosure.
Figure 6:
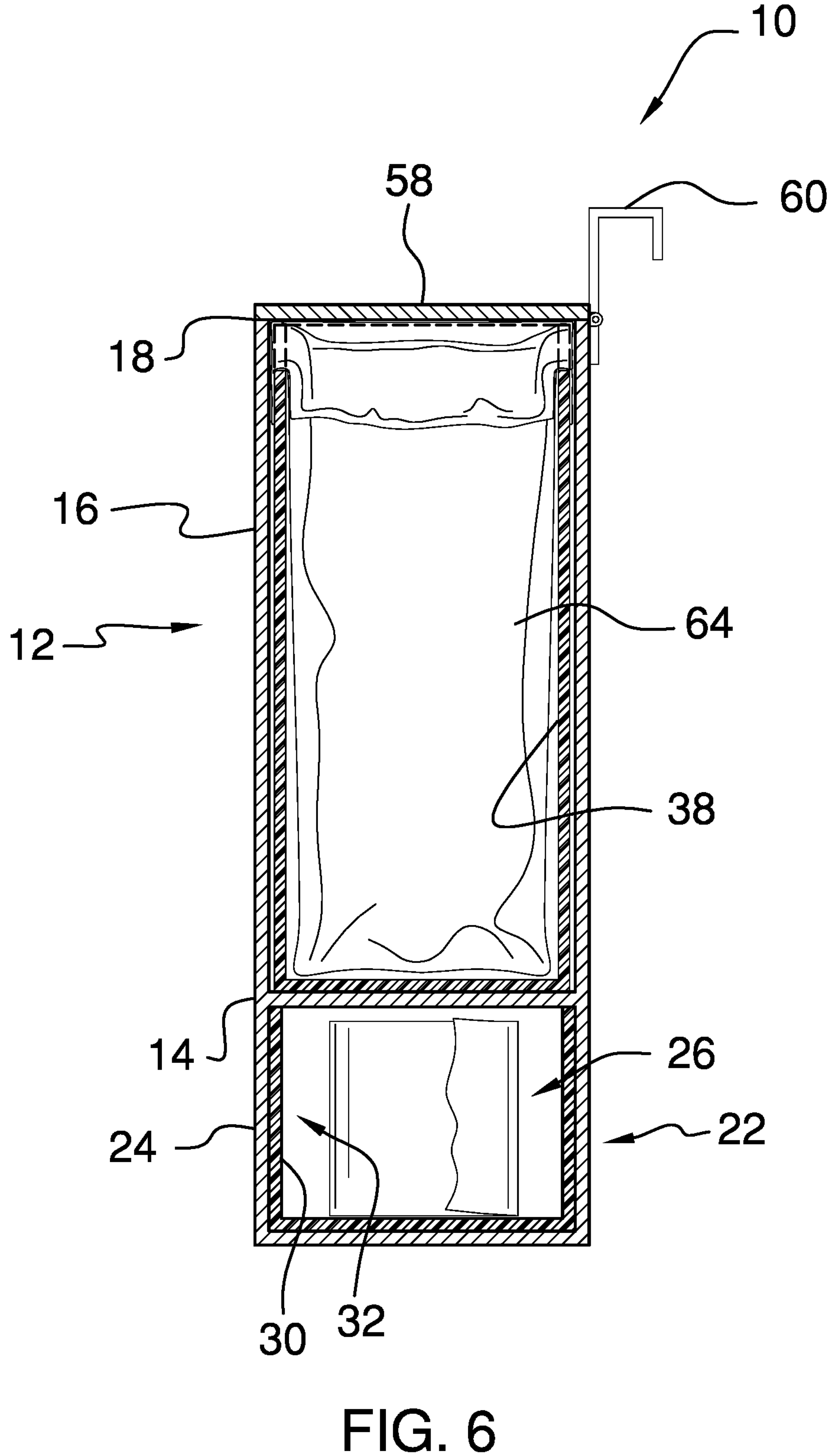
FIG. 6 is a cross-section view of an embodiment of the disclosure taken from Arrows 6-6 in FIG. 5.
Figure 7:
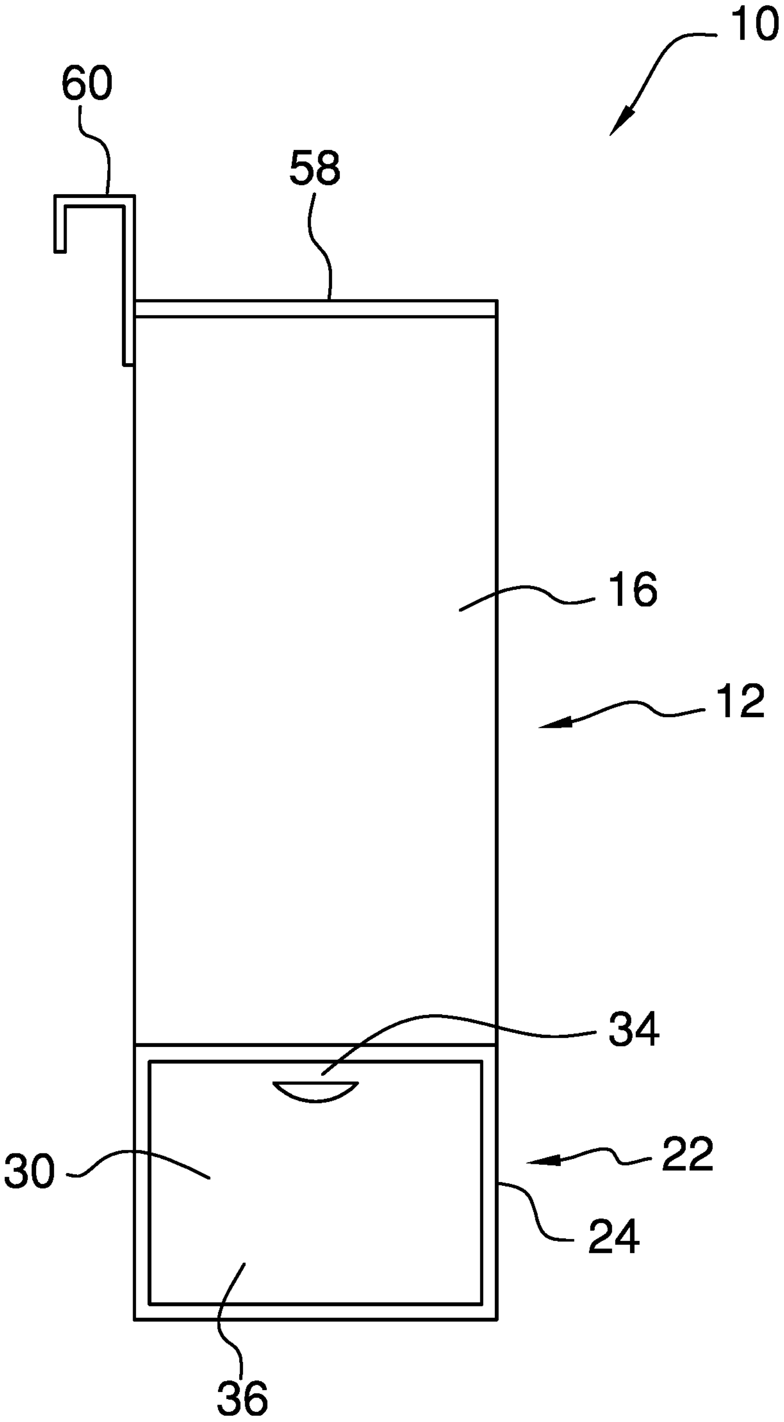
FIG. 7 is a side view of an embodiment of the disclosure.
Figure 8:
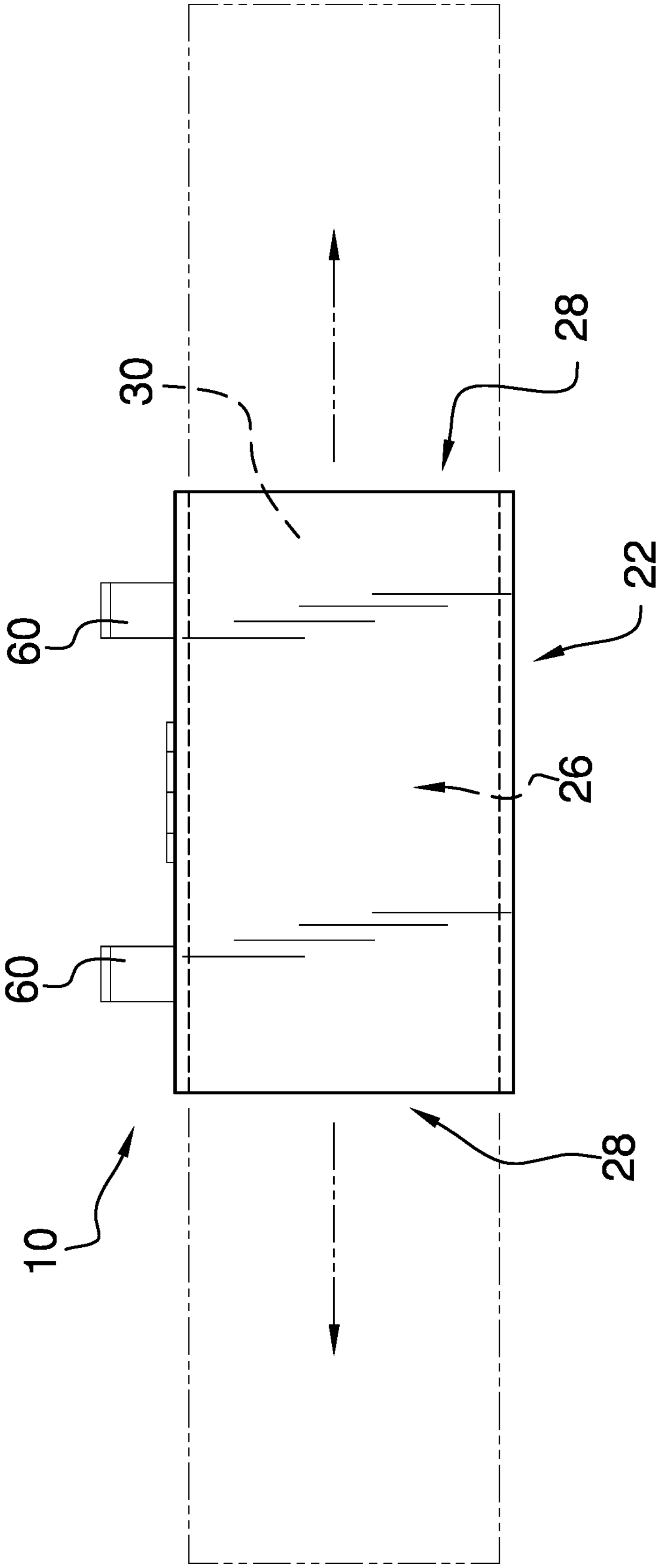
FIG. 8 is a bottom view of an embodiment of the disclosure.
Figure 9:
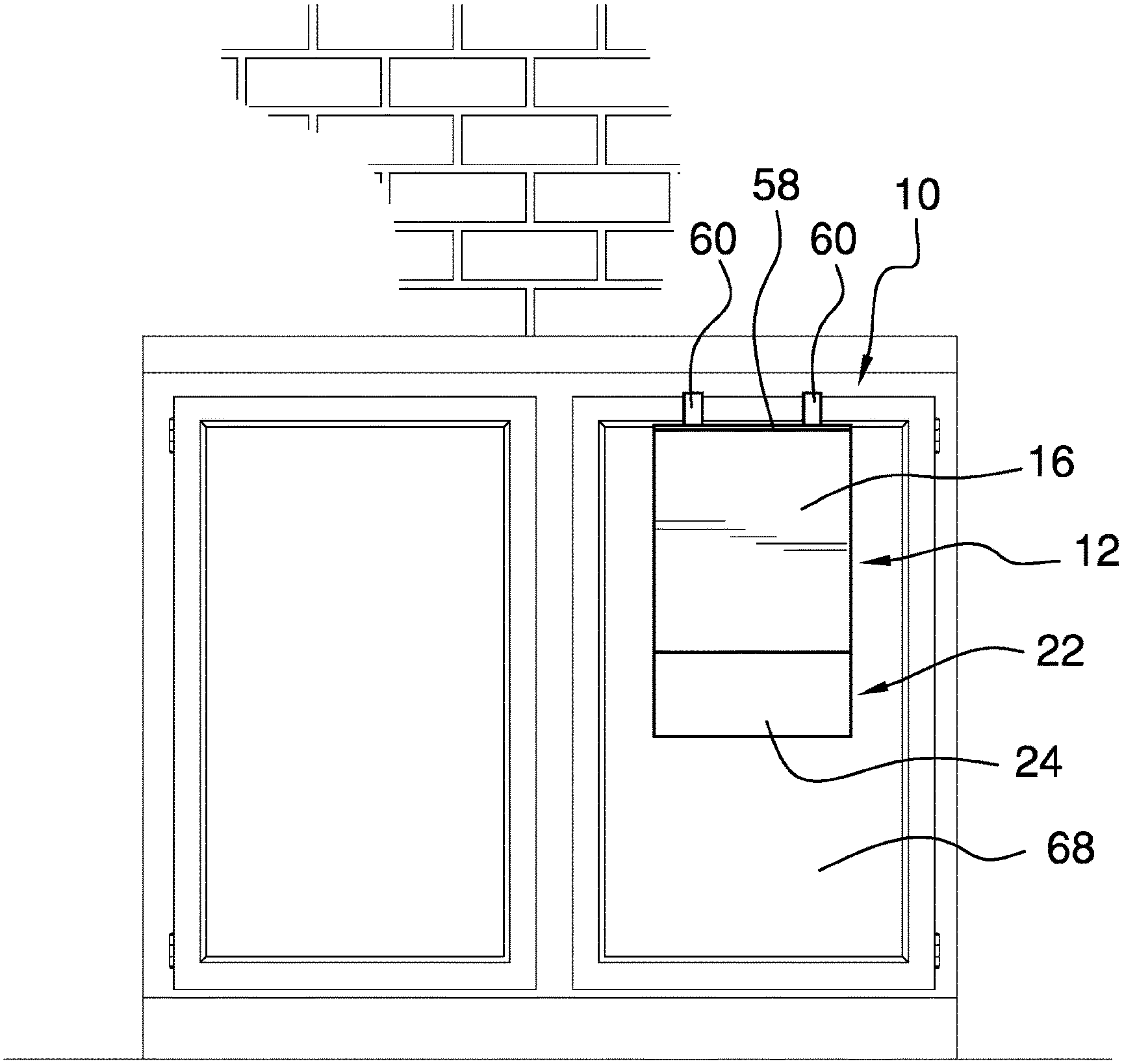
FIG. 9 is an in-use view of an embodiment of the disclosure.
Figure 10:
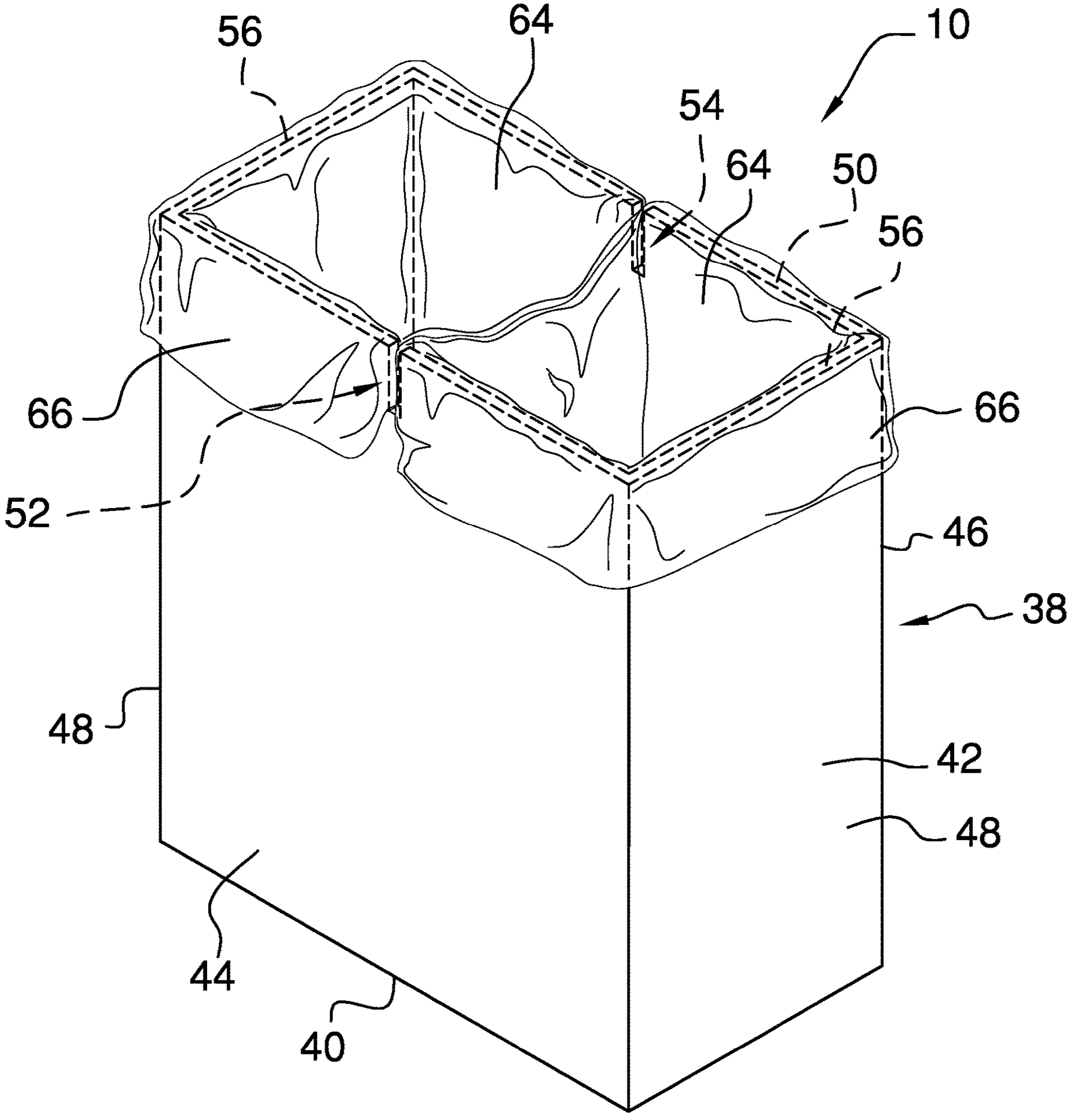
FIG. 10 is a detail view of a liner of an embodiment of the disclosure supporting a pair of bags.

With reference now to the drawings, and in particular to FIGS. 1 through 10 thereof, a new trash receptacle embodying the principles and concepts of an embodiment of the disclosure and generally designated by the reference numeral 10 will be described.

As best illustrated in FIGS. 1 through 10, the trash receptacle 10 generally comprises a container 12 with a base wall 14 and a perimeter wall 16. The perimeter wall 16 is coupled to and extends upwardly from the base wall 14, and an upper edge 18 of the perimeter wall 16 defines an opening 20 to the container 12. The base wall 14 has a rectangular shape. A storage compartment 22 is coupled to the base wall 14 of the container 12. The storage compartment 22 comprises a tubular wall 24 and a drawer 30. The tubular wall 24 defines a channel 26 which extends laterally with respect to the container 12 and defines a pair of apertures 28 to the channel 26. The apertures 28 are laterally spaced with respect to the container 12, and the channel 26 has a rectangular cross section. The drawer 30 is slidably coupled to the tubular wall 24 and is complementary in shape to the channel 26. The drawer 30 defines a cavity 32 which extends downwardly into the drawer 30. The drawer 30 has a pair of handles 34, each of which is positioned on an associated lateral side 36 of a pair of lateral sides 36 of the drawer 30.

A liner 38 is removably positionable in the container 12. The liner 38 has a bottom wall 40 and a peripheral wall 42, the peripheral wall 42 being coupled to and extending upwardly from the bottom wall 40. A top edge 50 of the peripheral wall 42 defines a front notch 52 and a rear notch 54. The front notch 52 is positioned on a front portion 44 of the peripheral wall 42, and the rear notch 54 is positioned on a rear portion 46 of the peripheral wall 42. The front notch 52 and the rear notch 54 define a pair of lateral segments 56 of the top edge 50, each of which is configured for supporting a rim 66 of an associated bag 64 of a pair of bags 64. The front notch 52 and the rear notch 54 are centered between a pair of lateral portions 48 of the peripheral wall 42. The top edge 50 of the peripheral wall 42 is positioned below the upper edge 18 of the container 12 when the liner 38 is positioned in the container 12.

A lid 58 is pivotably coupled to the container 12 and is movable to alternately open and close the opening 20. A pair of hooks 60 is removably mountable to the container 12. The pair of hooks 60 extends upwardly past the upper edge 18 of the container 12 when mounted to the container 12 and is configured to hang the container 12 on a cabinet door 68. A pair of connectors 62 is engageable with the pair of hooks 60 to mount the pair of hooks 60 to the container 12. The pair of connectors 62 comprises a pair of threaded fasteners but may comprise a latch, a hook 60-and-loop fastener, or the like.

In use, the bags 64 are positioned in the liner 38 and laterally positioned with respect to each other, and the liner 38 is positioned in the container 12. The bags 64 are accessible through the opening 20 by opening 20 the lid 58 and may be used to store garbage. Items may be stored in the drawer 30 of the storage compartment 22, which are accessible by moving the drawer 30 through either aperture 28 of the pair of apertures 28 of the channel 26. Such items may include toilet paper, facial tissues, linens, or the like, and the storage compartment 22 may be sized according to the items intended to be stored. The container 12 may be hung onto the cabinet door 68 via the pair of hooks 60, in which position the drawer 30 may still be accessed through either aperture 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trash receptacle comprising:

a container having a base wall and a perimeter wall, the perimeter wall being coupled to and extending upwardly from the base wall, an upper edge of the perimeter wall defining an opening to the container;

a storage compartment being coupled to the base wall of the container, the storage compartment comprising a tubular wall and a drawer, the tubular wall defining a channel which extends laterally with respect to the container, the tubular wall defining a pair of apertures to the channel, the pair of apertures being laterally spaced with respect to the container, the drawer being slidably coupled to the tubular wall; and a liner being removably positionable in the container, the liner having a bottom wall and a peripheral wall, the peripheral wall being coupled to and extending upwardly from the bottom wall, a top edge of the peripheral wall defining a front notch and a rear notch, the front notch being positioned on a front portion of the peripheral wall, the rear notch being positioned on a rear portion of the peripheral wall, the front notch and the rear notch defining a pair of lateral segments of the top edge, each lateral segment of the pair of lateral segments being configured for supporting a rim of an associated bag of a pair of bags.

2. The trash receptacle of claim 1, wherein the drawer defines a cavity which extends downwardly into the drawer.

3. The trash receptacle of claim 1, wherein the drawer has a pair of handles, each handle of the pair of handles being positioned on an associated lateral side of a pair of lateral sides of the drawer.

4. The trash receptacle of claim 1, wherein the front notch and the rear notch are centered between a pair of lateral portions of the peripheral wall.

5. The trash receptacle of claim 1, wherein the top edge of the peripheral wall is positioned below the upper edge of the container when the liner is positioned in the container.

6. The trash receptacle of claim 1, further comprising a lid being pivotably coupled to the container, the lid being movable to alternately open and close the opening.

7. A trash receptacle comprising:

a container having a base wall and a perimeter wall, the perimeter wall being coupled to and extending upwardly from the base wall, an upper edge of the perimeter wall defining an opening to the container;

a storage compartment being coupled to the base wall of the container, the storage compartment comprising a tubular wall and a drawer, the tubular wall defining a channel which extends laterally with respect to the container, the tubular wall defining a pair of apertures to the channel, the pair of apertures being laterally spaced with respect to the container, the drawer being slidably coupled to the tubular wall;

a pair of hooks being removably mountable to the container, the pair of hooks extending upwardly past the upper edge of the container when mounted to the container, the pair of hooks being configured to hang the container on a cabinet door; and a pair of connectors being engageable with the pair of hooks to mount the pair of hooks to the container, the pair of connectors comprising a pair of threaded fasteners.

8. A trash receptacle comprising:

a container having a base wall and a perimeter wall, the perimeter wall being coupled to and extending upwardly from the base wall, an upper edge of the perimeter wall defining an opening to the container, the base wall having a rectangular shape;

a storage compartment being coupled to the base wall of the container, the storage compartment comprising a tubular wall and a drawer, the tubular wall defining a channel which extends laterally with respect to the container, the tubular wall defining a pair of apertures to the channel, the pair of apertures being laterally spaced with respect to the container, the channel having a rectangular cross section, the drawer being slidably coupled to the tubular wall, the drawer being complementary in shape to the channel, the drawer defining a cavity which extends downwardly into the drawer, the drawer having a pair of handles, each handle of the pair of handles being positioned on an associated lateral side of a pair of lateral sides of the drawer;

a liner being removably positionable in the container, the liner having a bottom wall and a peripheral wall, the peripheral wall being coupled to and extending upwardly from the bottom wall, a top edge of the peripheral wall defining a front notch and a rear notch, the front notch being positioned on a front portion of the peripheral wall, the rear notch being positioned on a rear portion of the peripheral wall, the front notch and the rear notch defining a pair of lateral segments of the top edge, each lateral segment of the pair of lateral segments being configured for supporting a rim of an associated bag of a pair of bags, the front notch and the rear notch being centered between a pair of lateral portions of the peripheral wall, the top edge of the peripheral wall being positioned below the upper edge of the container when the liner is positioned in the container;

a lid being pivotably coupled to the container, the lid being movable to alternately open and close the opening;

a pair of hooks being removably mountable to the container, the pair of hooks extending upwardly past the upper edge of the container when mounted to the container, the pair of hooks being configured to hang the container on a cabinet door; and a pair of connectors being engageable with the pair of hooks to mount the pair of hooks to the container, the pair of connectors comprising a pair of threaded fasteners.

* * * * *